United States Patent
Satchell, Jr.

(10) Patent No.: US 6,910,431 B2
(45) Date of Patent: Jun. 28, 2005

(54) BURNER-LANCE AND COMBUSTION METHOD FOR HEATING SURFACES SUSCEPTIBLE TO OXIDATION OR REDUCTION

(75) Inventor: Donald Prentice Satchell, Jr., Berkeley Heights, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 10/331,624

(22) Filed: Dec. 30, 2002

(65) Prior Publication Data

US 2004/0123784 A1 Jul. 1, 2004

(51) Int. Cl.$^7$ .............................................. F23D 1/00
(52) U.S. Cl. ..................................................... 110/347
(58) Field of Search ................................ 110/204, 238, 110/261, 263, 347; 431/9 FA, 181 FA, 187 FA, 8 FA, 284 FA

(56) References Cited

U.S. PATENT DOCUMENTS

| | | | | |
|---|---|---|---|---|
| 5,346,390 A | * | 9/1994 | Slavejkov et al. | 431/8 |
| 5,954,855 A | | 9/1999 | Gitman et al. | |
| 6,139,310 A | * | 10/2000 | Mahoney et al. | 431/8 |
| 6,142,764 A | * | 11/2000 | Anderson et al. | 431/8 |
| 6,241,510 B1 | * | 6/2001 | Anderson et al. | 431/8 |
| 6,244,854 B1 | | 6/2001 | Satchell et al. | |
| 6,250,915 B1 | | 6/2001 | Satchell et al. | |
| 6,254,379 B1 | | 7/2001 | Bool et al. | |
| 6,383,445 B1 | * | 5/2002 | Anderson et al. | 266/225 |
| 6,450,799 B1 | * | 9/2002 | Mahoney et al. | 431/8 |
| 6,474,982 B2 | * | 11/2002 | Satchell et al. | 432/19 |

* cited by examiner

*Primary Examiner*—Kenneth Rinehart
(74) *Attorney, Agent, or Firm*—Joshua L. Cohen

(57) ABSTRACT

A method of heating a surface susceptible to oxidation or reduction includes generating a central, generally cylindrical, fuel-rich particulate jet, and a coaxial, annular, supersonic velocity, oxidant-rich jet having an auto-thermal ignition temperature greater than the temperature of the fuel-rich particulate jet, directed toward the surface to be heated, the velocity of the fuel-rich particulate jet being less than the velocity of the oxidant-rich jet; allowing the supersonic oxidant-rich jet and the fuel-rich particulate jet to coact to form a coherent particulate fuel-rich and fuel-lean jet having a central particulate fuel-rich region and a coaxial annular fuel-lean region; impinging the coherent particulate fuel-rich and fuel-lean jet upon the surface to be heated for forming a turbulent reaction zone at the surface; and controlling oxidation and reduction reactions at the turbulent reaction zone by adjusting properties of the supersonic oxidant-rich jet and/or the fuel-rich particulate jet.

21 Claims, 4 Drawing Sheets

FIG. 2
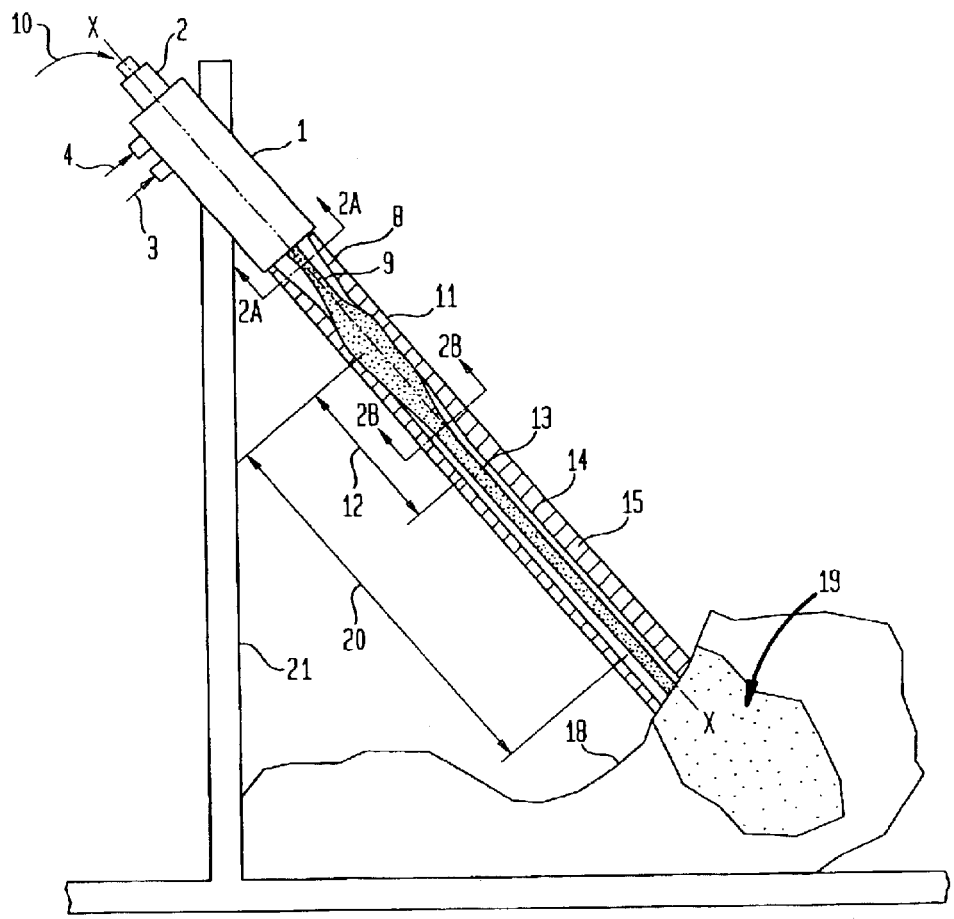
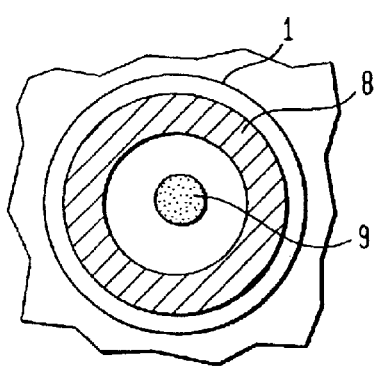
FIG. 2A
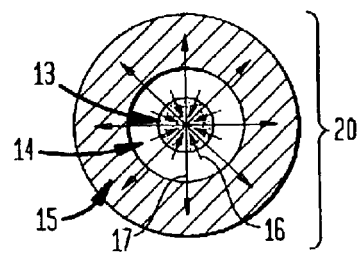
FIG. 2B

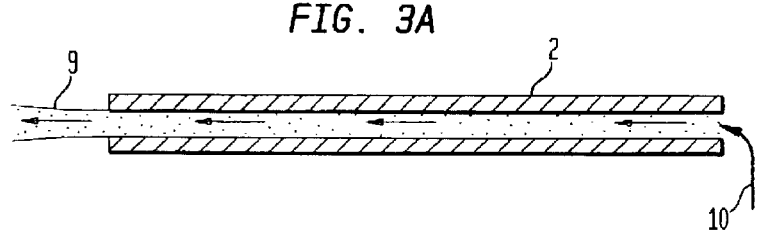
FIG. 3A
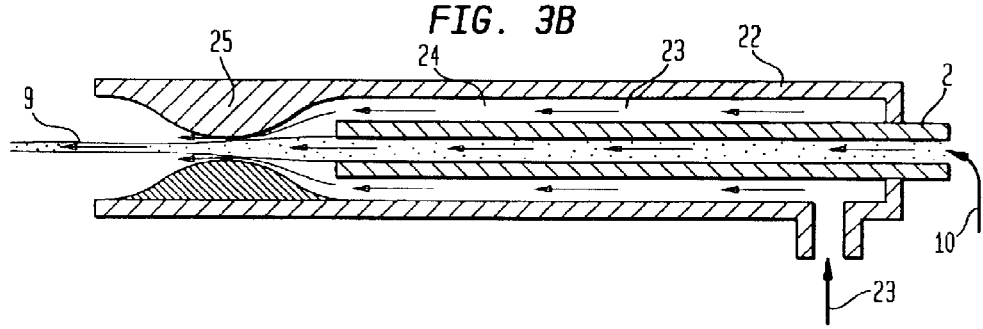
FIG. 3B
FIG. 3C
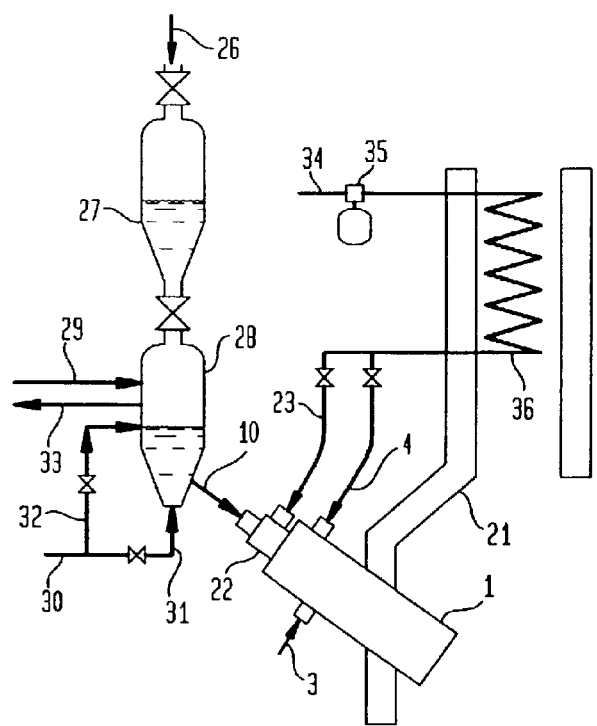

BURNER-LANCE AND COMBUSTION METHOD FOR HEATING SURFACES SUSCEPTIBLE TO OXIDATION OR REDUCTION

BACKGROUND

Combustion processes are often used to heat oxidation sensitive materials in furnaces. For example, burners are used to preheat the scrap steel feed in electric arc furnace steelmaking processes. Practical considerations often require that the burner be placed at a distance from the material to be heated that is much greater than the optimum distance preferred from a purely heat transfer viewpoint. In addition, heating oxidation sensitive materials requires either control of the oxidation potential at the surface or a subsequent reduction step.

U.S. Pat. No. 6,250,915 seeks to address this problem for gaseous fuels by disclosing use of parallel fuel-rich and fuel-lean gaseous jets. Impingement of the parallel fuel-rich and fuel-lean jets on a surface initiates combustion reactions in close proximity to the surface, which substantially increases the heat transfer rate and efficiency. The jet array can be adjusted to maintain appropriate fuel-rich or fuel-lean atmosphere in contact with the surface. In one embodiment, the use of a low velocity coherent jet consisting of an array of parallel fuel-rich and fuel-lean zones provides efficient heat transfer and reasonable control of the oxidation potential of the melting zone. This technique increases the heat transfer rate to the surface and the ability to control surface oxidation. This technique is effective when the fuel-rich and fuel-jets have similar densities, which in turn requires gaseous fuels and oxidants.

There are, however, many industrial processes where gaseous fuels or oxidants are not used because solid fuels, oxidants, and/or reagents are preferred; for example, coal, carbon or coke are usually the preferred reducing agents and fuels for most iron and steel production processes. By way of further example, metallurgical processes typically require the injection of particulate reagents, e.g., lime.

U.S. Pat. No. 6,254,379 seeks to address particulate injection by having a reagent containing carrier gas pass through a flame envelope. The flame envelope forms a fluid shield or barrier around the gas jet to minimize ingression of gas into the jet and maintain a coherent jet. The flame envelope has a velocity that is less than the velocity of the jet. As the jet exits the flame envelope, the rate of gas entrainment increases and the jet loses its coherency and delivers the reagent to a diffuse reaction zone as a turbulent jet. In contrast, the heating method disclosed in U.S. Pat. No. 6,250,915 teaches that the jet coherency be maintained, to the maximum extent possible, until the jet impacts the surface in order to provide a well-defined reaction zone and increase heat and mass transfer efficiency to the surface. Metallurgical processes typically require significant heat input coincident with solids injection.

U.S. Pat. No. 5,954,855 discloses techniques to use direct flame impingement, high velocity oxygen jets, and carbonaceous fuel injection jets to melt steel in electric arc furnaces. High efficiency melting requires the simultaneous feeding of oxygen and a carbonaceous jet to the melting zone. However, it is very difficult to precisely feed oxygen and carbon from separate lances, with different characteristics, to a melting zone that is a constantly moving melting steel surface.

Despite the above teachings, there is no process disclosed for condensed phase fuels, reducing, or oxidizing agents. Therefore, there is still a need for a system to generate a coherent jet having a fuel-rich zone, a fuel-lean zone, and a condensed phase fuel or reagent to efficiently heat and treat surfaces. It would also be desirable to have a system whereby troublesome by-product iron oxide fines from metallurgical processes could be recycled using an efficient particulate injection and heating method.

SUMMARY

A method of heating a surface susceptible to oxidation or reduction is provided, comprising:

a) generating a central, generally cylindrical, fuel-rich particulate jet, and a coaxial, annular, supersonic velocity, oxidant-rich jet having an auto-thermal ignition temperature greater than the temperature of the fuel-rich particulate jet, directed toward the surface to be heated, wherein the velocity of the fuel-rich particulate jet is less than the velocity of the oxidant-rich jet;

b) allowing the supersonic oxidant-rich jet and the fuel-rich particulate jet to coact to form a coherent particulate fuel-rich and fuel-lean jet having a central particulate fuel-rich region and a coaxial annular fuel-lean region;

c) impinging the coherent particulate fuel-rich and fuel-lean jet upon the surface to be heated for forming a turbulent reaction zone at the surface; and d) controlling oxidation and reduction reactions at the turbulent reaction zone by adjusting at least one property of at least one of the supersonic oxidant-rich jet and the fuel-rich particulate jet.

BRIEF DESCRIPTION OF THE DRAWINGS

For a more complete understanding of the present invention, reference may be had to the detailed description taken in conjunction with the following drawings, of which:

FIG. 2 is a schematic representation of an arrangement of parallel fuel-rich and fuel lean-jets to heat a surface.

FIGS. 2A and 2B are cross sections of the fuel jets taken along corresponding section views 2A—2A and 2B—2B of FIG. 2.

FIGS. 3A and 3B are schematic representations of alternate systems to improve the performance of a lance and provided feed streams. FIG. 3C is a schematic representation of a method of producing a motive gas.

DETAILED DESCRIPTION

The present invention relates to a burner-lance and combustion method for heating surfaces that are susceptible to oxidation or reduction in industrial furnaces.

The burner lance and combustion method of the present invention produces and uses coherent jets. The coherent jets have an annular fuel-lean gas jet and a coaxial cylindrical fuel-rich jet that contains a condensed fuel or reagent. These coaxial jets are used to transport particles and to heat surfaces by direct impingement upon such surfaces, and in certain embodiments, to simultaneously transport the particles for heating.

Combustion gases are used to efficiently transport condensed phase fuels or reagents to a surface to be heated. The higher temperature of a flame increases its viscosity, helping to maintain the coherent particulate containing jet. A coherent, higher temperature supersonic annular flame jet is therefore produced to confine and direct a lower velocity and coaxial jet containing the particles. Thus, the particles in the jet tend to move toward the lower shear and lower temperature region along an axis of the jet, due to its lower velocity gradient and viscosity. These powerful forces produce a very compact particulate jet along, in particular, the axis of the jet.

The formation of this compact particulate jet substantially reduces interaction between any particulate fuel and the hotter, higher velocity oxidizing annular gaseous shroud gas. This limited interaction between the fuel-rich particle jet and the annular fuel-lean gas shroud having a greater temperature and velocity, produces a combustion gas shroud region around the central fuel-rich particulate jet.

In addition, the lower temperature of the fuel-rich particulate jet decreases the overall heat lost to the walls of the industrial furnace prior to impingement of the coherent jet with the surface to be heated. This advantage results from the fact that solids have much higher emissivities than the fuel-lean shroud gas. When the aforementioned coherent jet impinges the surface to be heated, the adjacent fuel-lean and fuel-rich regions burn, in close contact with the surface to be heated, to achieve unusually efficient heat transfer and good control of combustion stoichiometry. Thus, significant advantages are provided by generating coaxially parallel fuel-rich and fuel-lean jets utilizing non-gaseous fuel for heating surfaces.

Figure 1:
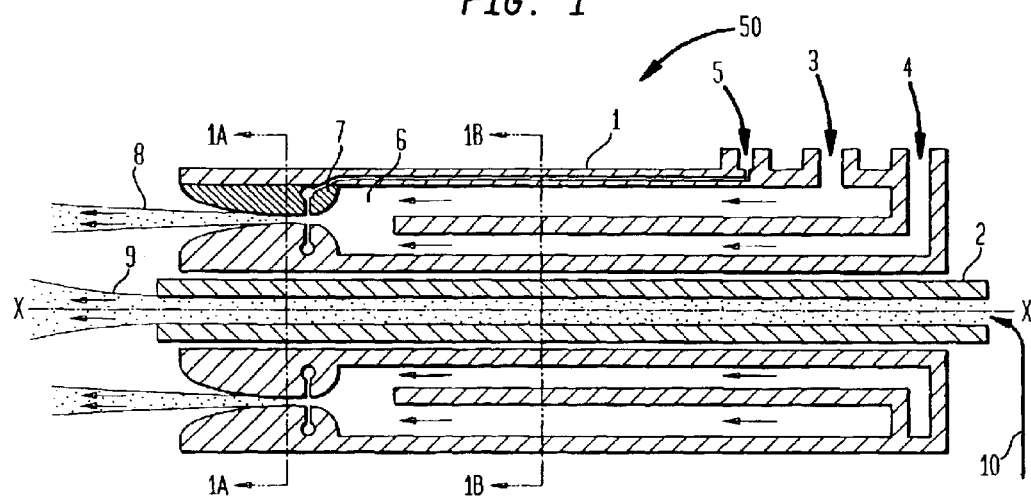
FIG. 1 is a cross-section of a burner to produce parallel fuel-rich and fuel-lean jets with at least one non-gaseous feed.
Figure 1A:
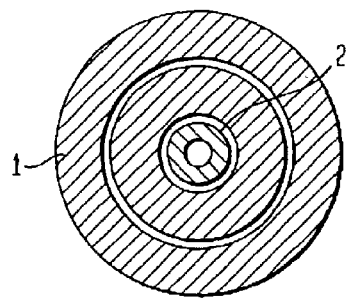
FIGS. 1A and 1B are cross sections of the burner taken along corresponding section views 1A—1A and 1B—1B of FIG. 1.
Figure 1B:
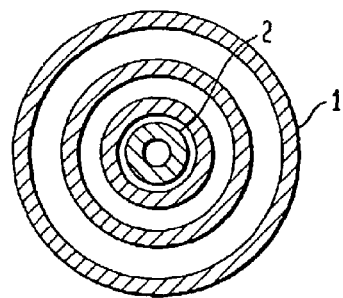

With reference to FIG. 1, a burner-lance according to the present invention and shown generally at 50 includes an annular hot oxidant-lance 1 and central fuel-lance 2. The central fuel-lance 2 provides for a lower velocity jet as discussed below and accordingly, the fuel-lance 2 may also be referred to as the lower velocity central fuel-lance 2. The annular hot oxidant-lance 1 and lower velocity central fuel-lance 2 may comprise a single unit or separate units as shown in FIG. 1. Since the lower velocity central fuel-lance 2 is usually inspected, repaired and replaced more often than the annular hot oxidant-lance 1, the fuel-lance 2 may be removably mountable with respect to the oxidant-lance 1 as a separate element to be easily removed, inspected and repaired.

The annular hot oxidant-lance 1 is preferably constructed using high strength steel, copper, nickel or copper-nickel alloys, and is preferably equipped with cooling channels (not shown) to limit its rate of surface oxidation. Ceramic materials are also appropriate materials of construction for the hot oxidant-lance 1. The central fuel-lance 2 may also contain cooling channels (not shown) and similar materials of construction may be used. However, the temperature and composition of gas in contact with the annular hot oxidant-lance 1 may determine the most appropriate materials of construction.

The oxidant-lance 1 has a gaseous oxidant feed 3; fuel feed 4; and, an optional inert containing gas feed 5. The oxidant feed 3 may be air, oxygen ($O_2$) enriched air, substantially pure oxygen, chlorine containing gas or fluorine containing gas. Substantially pure oxygen may be greater than 0.7 molar fraction $O_2$, in other embodiments greater than 0.9 molar fraction $O_2$, and in still other embodiments, greater than 0.95 molar fraction $O_2$.

Provided to the oxidant-lance 1, is an appropriate fuel for the oxidants. For example, hydrocarbons, elemental sulfur and metal hydrides are appropriate fuels for oxygen, chlorine, and fluorine oxidants. With a fluorine containing oxidant, many gases, e.g. steam, are also potential gaseous fuels. The oxidant feed 3 and fuel 4 are transported to an oxidation reactor 6. Products of the oxidation reaction are fed to an annular converging-diverging nozzle 7 to produce an annular supersonic oxidant-rich jet 8 around the axis X—X. Appropriate gaseous fuels include natural gas, petroleum distillate vapor, coal tar distillate vapor, and carbon monoxide and hydrogen-rich gaseous products from partial oxidation processes. Liquid fuel could be used with an appropriate atomizer. Appropriate liquid fuels include petroleum and coal distillate and residua liquid fuels.

An inert gas feed 5, such as nitrogen, may be used to protect the surface of the annular converging-diverging nozzle 7 from the products of the oxidation reaction. The use of an inert gas feed 5, such as to envelope the oxidant feed and oxidation products, becomes progressively more important as a more powerful gaseous oxidant feed 3 is used. The inert gas feed 5 is more necessary with fluorine containing oxidant feeds.

Generally, the gaseous oxidant feed 3 and annular hot oxidant-lance gaseous fuel 4 properties, such as flow rates and pressures, and the converging-diverging nozzle $A_{c1}/A_2$ area ratio may be adjusted by trial and error to achieve the desired annular supersonic oxidant-rich jet temperature and velocity. $A_{c1}$ is the minimum nozzle cross-sectional area at the throat of the nozzle 7 and $A_2$ is the nozzle maximum downstream cross-sectional area.

In certain embodiments, the velocity of the annular supersonic oxidant-rich jet 8 may typically be greater than 1.25 times the sonic velocity (Mach 1.25) in the throat of the nozzle 7. In other embodiments, the velocity of the annular supersonic oxidant-rich jet 8 may typically be greater than about 1.5 times the sonic velocity (Mach 1.5) in the throat of the nozzle 7.

The temperature of the annular supersonic oxidant-rich jet 8 should typically be greater than the auto-thermal ignition temperature of the lower velocity fuel rich jet 9 produced by the central fuel-lance 2 to ensure stable operation. Excessive temperatures of the annular supersonic oxidant-rich jet 8 should be avoided in order to maintain reliable operation of the annular converging-diverging nozzle 7.

As shown in FIG. 1, the central fuel-lance 2 is a pipe that functions as a conduit for a lower velocity, particulate, fuel-rich feed 10. The feed 10 enters the central fuel-lance 2 at a proximal end of the fuel lance 2 and exits at a distal end of the fuel lance 2 as a lower velocity, cylindrical, and fuel-rich particulate jet 9. The particulate, fuel-rich feed 10 contains particles.

A particle is defined as a non-gaseous fuel or reagent. A non-gaseous substance can be a solid or a liquid at the feed temperature and pressure. A reagent is a substance that interacts with the surface to be heated. A fuel is a substance that can be rapidly oxidized by the annular supersonic oxidant-rich jet. There are situations where particles can be both a fuel and reagent. For example, carbon could be rapidly oxidized or injected into a molten iron bath by the annular supersonic oxidant-rich jet 8. In the latter situation, the carbon could interact with the iron bath and be dissolved by the molten iron.

The lower velocity, cylindrical, fuel-rich particulate jet 9 can also contain gaseous fuels or inert components. For example, either natural gas (a fuel) or argon (usually an inert) could be used to facilitate particulate transport. In addition, a particulate substance could be used to facilitate transport of another particulate component. For example, a liquid fuel oil could be used to facilitate transport for coal particles.

FIG. 2 illustrates how the annular supersonic oxidant-rich jet 8 and lower velocity, cylindrical, fuel-rich particulate jet 9 are used to efficiently heat a surface and optionally add reagents to a surface 18. In various embodiments, the fuel-rich jet 9 velocity is less than 90% of the oxidant-rich jet 8 velocity, or less than 75% of the oxidant-rich jet 8 velocity, or less than 50% of the oxidant-rich jet 8 velocity (FIG. 2A). The higher velocity of the supersonic oxidant-rich jet 8 results in entrainment and acceleration of the lower velocity fuel-rich jet 9 within a turbulent mixing region 11 forming coherent jet 20 having a central, lower shear, fuel rich region 13 and an outer, higher shear, fuel lean region 15. In certain embodiments, the supersonic oxidant-rich jet and the fuel-rich particulate jet coact over a distance of about 0.5 meters.

As shown in FIG. 2B, as the velocity of the particulate matter in the fuel-rich jet approaches the velocity of the gaseous oxidant, particles flow (arrow 16) radially toward an axis X—X of the coherent jet 20 in a short formation zone 12 and away from the coherent jet outer, higher shear, fuel-lean region 15, toward the coherent jet central, lower shear, fuel-rich region 13. The fuel rich fuel gas flows (arrow 17) radially away from the axis X—X of the coherent jet 20 and the coherent jet central, lower shear, fuel-rich region 13 in the formation zone 12, toward the coherent jet outer, higher shear, fuel-lean (or oxidant-rich) region 15, which produces a coherent jet intermediate combustion gas shroud 14. The gas shroud 14 limits the interaction between the fuel-rich region 13 and the fuel-lean region 15 until the coherent jet 20 impinges the surface 18 to be heated.

A turbulent reaction zone 19 is formed by impingement of the coherent particulate fuel-rich and fuel-lean jet 20 with the surface 18. Maximum process efficiency is observed in the coherent jet 20 that is perpendicular to the surface to be heated 18. The relative amounts of oxidant and fuel in the turbulent reaction zone 19 can be controlled in certain embodiments by controlling oxidant and fuel properties such as feed rates to the supersonic annular hot oxidant-lance 1 and the lower velocity central fuel-lance 2.

Refractory furnace walls, such as shown generally at furnace wall 21, are advantageously used to minimize heat losses.

This burner and combustion method is useful for iron and steel production. Coal is a particularly useful component of the particulate, fuel-rich feed 10 for iron and steel melting. The coal volatile matter is evolved as the coal particles are heated in the central fuel-rich region 13, which helps to form the intermediate gas shroud 14. The gas shroud 14 protects the coal char particles in the fuel-rich region 13 from further oxidation. Upon impact with the surface 18, the coal char dissolves in the molten iron to decrease the rate of iron oxidation, or to chemically reduce iron oxide, thereby increasing the iron yield of the melting process. Lime (CaO) can be advantageously added to the particulate, fuel-rich feed 10 to decrease the viscosity of the iron oxide rich phase in contact with the turbulent reaction zone 19 and increase the rate of the iron oxide-carbon reduction reaction. By-product iron oxide fines from metallurgical processes can also be recycled and injected in the particulate, fuel-rich feed.

FIGS. 3A and 3B illustrate a plurality of approaches to improve the performance of the lower velocity central fuel-lance 2. FIG. 3A shows the lower velocity central fuel-lance 2 of FIG. 1. FIG. 3B shows a higher velocity central fuel-lance 22 using a central fuel-lance motive gas 23 introduced at feed 23a for the fuel-lance 22 to substantially increase the velocity of the lower velocity, cylindrical, fuel-rich particulate jet 9, (although less than the velocity of the supersonic oxidant-rich jet). The higher velocity central fuel-lance 22 includes lower velocity central fuel-lance 2, a central fuel lance motive gas conduit 24, and a central fuel-lance converge-divergent nozzle 25. The motive gas 23 may be an inert gas, e.g. argon, typically for use in steel making; or a fuel, e.g. natural gas, vaporized petroleum or coal derived liquids, and carbon monoxide and hydrogen-rich streams from partial oxidation processes. The nozzle 25 is positioned at the distal end of the fuel-lance 2. The gas conduit 24 directs the motive gas 23 such that the particulate, fuel-rich feed 9 exiting the distal end of the fuel-lance 2 does not contact the converge-divergent nozzle 25. The velocity of the higher velocity central fuel-lance 22 should be selected so as to avoid excessive erosion of the central fuel-lance converge-divergent nozzle 25, in relation to the velocity of the lower velocity, cylindrical, fuel-rich particulate jet 9 and the particulate, fuel-rich feed 10 rate, as well as the particulate and gaseous compositions desired to be used.

FIG. 3C shows alternative embodiments for producing the feed streams. The solid particulate feed 26 for the particulate, fuel-rich feed 10 could be stored in a solid particulate feed hopper 27. The particulate feed 26 is periodically transferred from the hopper 27 to a solid particulate feed lock hopper 28. The lock hopper 28 may be pressurized with either a non-fluidizing motive fluid feed 32 or a separate lock hopper pressurizing gas 29. The motive fluid 30 and pressurizing gas 29 may be an inert gas (e.g., argon or nitrogen), a gaseous fuel (e.g., natural gas) or liquid fuel (e.g., petroleum derived fuel oil). The pressurizing gas 29 is typically used with the motive fluid 30.

Once the lock hopper 28 is pressurized, a fluidizing motive fluid feed 31 is used to increase the mobility of the particulate feed 26 in the bottom of the feed lock hopper 28. The fluidizing motive fluid may comprise the same composition as the pressurizing gas 29 or motive fluid 30. A similar quantity of material 33 is withdrawn from the lock hopper 28 and may be either vented or recycled. The rate of the fluidizing motive fluid feed 31 can be used to control the ratio of the particulate feed 26 to the motive fluid 30 in the particulate, fuel-rich feed 10. A flow rate of the non-fluidizing motive fluid feed 32 can be used to control the overall feed rate of the particulate, fuel-rich feed 10.

As discussed above, the motive gas 23 may be a pressurized gaseous fuel. FIG. 3C shows alternative methods to produce the motive gas 23. A distillate fuel feed pump 35 can cost-effectively increase the pressure of a liquid distillate fuel 34. Then, a distillate fuel vaporizer 36 can produce the motive gas 23 and annular hot oxidant lance gaseous fuel 4. This approach can avoid the capital and operating cost associated with compressing gaseous fuel to the annular converging-diverging nozzle 7 inlet pressure. In addition, this approach increases the range of potential appropriate fuels.

EXAMPLE

Figure 4:
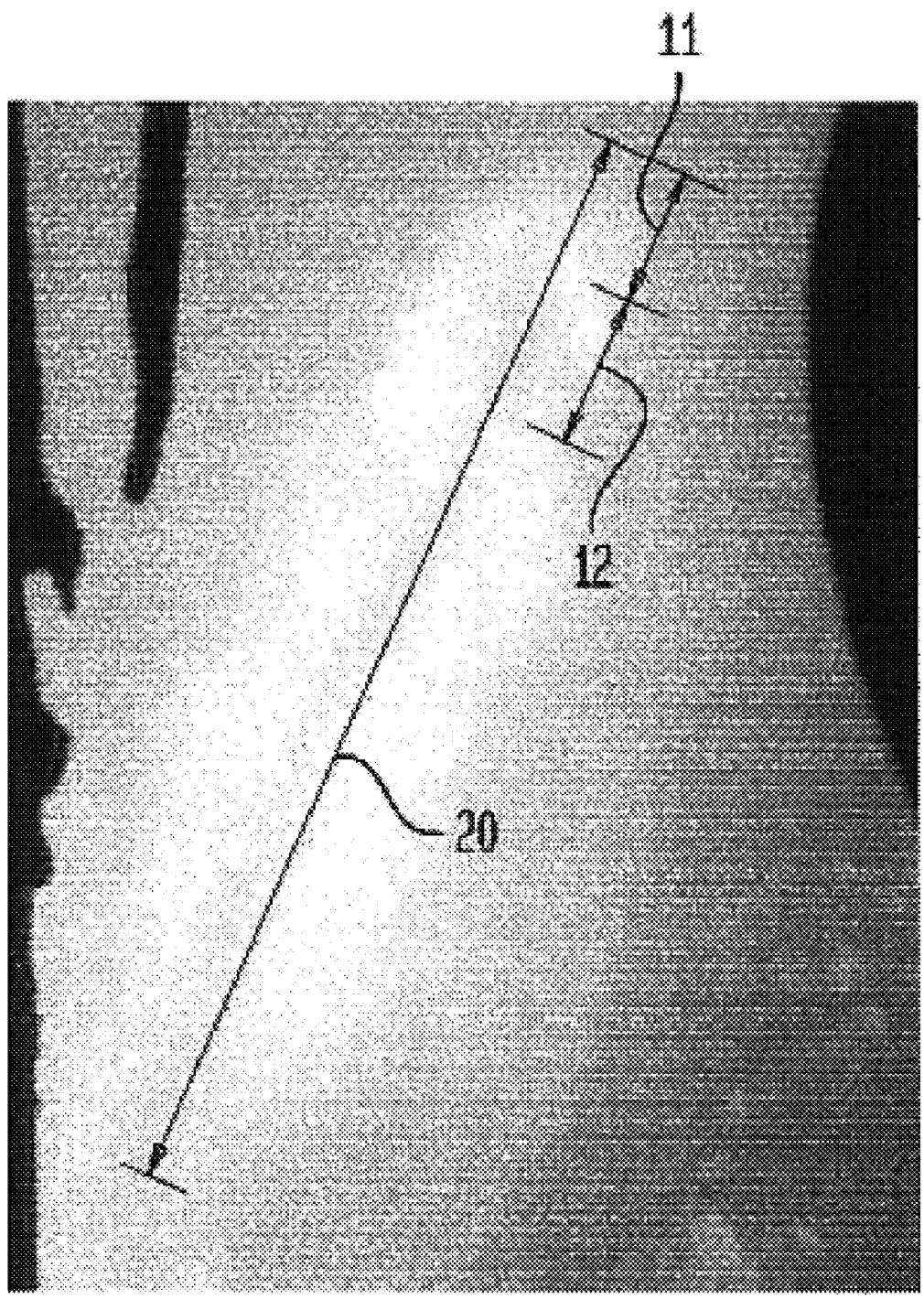
FIG. 4 is a photograph of the various regions providing a coherent particulate fuel-rich and fuel-lean jet.

FIG. 4 shows, in an electric arc furnace steel making process, a coherent jet produced by a high velocity central fuel-lance using nitrogen as the central fuel-lance motive gas for a coal particulate feed, and an annular supersonic oxidant-rich jet at Mach 1.5, using methane (natural gas) as the annular hot oxidant-lance gaseous fuel and substantially pure oxygen as the oxidant. These operating conditions provided a short turbulent mixing region 11, a short coherent jet formation zone 12, and a long coherent particulate fuel-rich and fuel-lean jet 20.

It will be understood that the embodiments described herein are merely exemplary and that a person skilled in the art may make many variations and modifications without departing from spirit and scope of the invention. The various embodiments may be practiced in the alternative, or in combination, as appropriate. All such modifications and variations are intended to be included within the scope of the invention as defined in the appended claims.

What is claimed is:

1. A method of heating a surface susceptible to oxidation or reduction, comprising:

generating a central, generally cylindrical, fuel-rich particulate jet, and a coaxial, annular, supersonic velocity, oxidant-rich jet having an auto-thermal ignition temperature greater than a temperature of the fuel-rich particulate jet, the jets directed toward the surface to be heated, wherein a velocity of the fuel-rich particulate jet is less than the velocity of the oxidant-rich jet;

increasing the velocity of the fuel-rich particulate jet with a motive gas selected from the group consisting of an inert gas, argon, nitrogen, fuel, natural gas, vaporized petroleum liquids, vaporized coal derived liquids, carbon monoxide and hydrogen-rich streams from partial oxidation process, a pressurized gaseous fuel, a vaporized liquid distillate fuel feed, a fuel similar to the fuel used in generating the oxidant rich, and mixtures thereof;

allowing the supersonic oxidant-rich jet and the fuel-rich particulate jet to coact to form a coherent particulate fuel-rich and fuel-lean jet having a central particulate fuel-rich region and a coaxial annular fuel-lean region;

impinging the coherent particulate fuel-rich and fuel-lean jet upon the surface to be heated for forming a turbulent reaction zone at the surface; and controlling oxidation and reduction reactions at the turbulent reaction zone by adjusting at least one property of at least one of the supersonic oxidant-rich jet and the fuel-rich particulate jet.

2. The method of claim 1, further comprising:

forming a coherent jet combustion shroud region between the central particulate fuel-rich region and the coaxial annular fuel-lean region.

3. The method of claim 1 wherein the supersonic oxidant-rich jet and the fuel-rich particulate jet coact over a distance of about 0.5 meters.

4. The method of claim 1 wherein the velocity of the oxidant-rich jet is greater than about Mach 1.25, and optionally greater than about Mach 1.5.

5. The method of claim 1 wherein generating the oxidant-rich jet comprises:

feeding a fuel and a stoichiometric excess of oxidant, optionally in the presence of an inert gas, and at least partially oxidizing the fuel.

6. The method of claim 5 wherein the oxidant is selected from the group consisting of air, oxygen enriched air, substantially pure oxygen, chlorine containing gas and fluorine containing gas.

7. The method of claim 6 wherein the fuel is selected from the group consisting of hydrocarbons, elemental sulfur, metal hydrides, and steam.

8. The method of claim 6 wherein the fuel a gaseous fuel selected from the group consisting of natural gas, petroleum distillate vapor, coal tar distillate vapor, coal tar distillate vapor, carbon monoxide and hydrogen-rich gaseous products of partial oxidation processes, atomized liquid fuels, petroleum liquid fuels, coal distillate liquid fuels and residual liquid fuels.

9. The method of claim 1 wherein at least one of the fuel-rich particulate jet, and the oxidant-rich jet comprises an inert gas.

10. The method of claim 1 wherein the fuel-rich particulate jet comprises non-gaseous particles selected from the group consisting of a non-gaseous fuel, a reagent, and combinations thereof.

11. The method of claim 10 further comprising feeding the non-gaseous particles to the fuel-rich particulate jet as a solid.

12. The method of claim 10 further comprising feeding the non-gaseous particles to the fuel-rich particulate jet as liquid.

13. The method of claim 1 wherein the fuel-rich particulate jet comprises at least one of a gaseous fuel, optionally natural gas; an atomizable liquid particulate, optionally a liquid fuel oil; or an inert gas, optionally argon or nitrogen, for facilitating particulate transport.

14. The method of claim 1, further comprising:

producing the coherent particulate fuel-rich and fuel-lean jet, wherein nitrogen is the motive gas for the fuel-rich particulate jet; and, oxidizing methane as a gaseous fuel for generating the annular supersonic oxidant-rich jet.

15. The method of claim 1 wherein generating the fuel-rich particulate jet, comprises:

pressurizing a particulate feed with at least one of a non-fluidizing motive fluid and a pressurizing gas; and, increasing mobility of the particulate feed with a fluidizing motive fluid; wherein the motive fluid, the pressurizing gas and the fluidizing motive fluid are independently selected from a group consisting of an inert gas, argon, nitrogen, a gaseous fuel, natural gas, a liquid fuel, and a petroleum derived fuel oil.

16. The method of claim 15, further comprising: controlling at least one of:

a ratio of the particulate feed to the motive fluid in the particulate, fuel-rich jet by adjusting the flow rate of the fluidizing motive fluid; and a feed rate of the particulate feed by adjusting the flow rate of the non-fluidizing motive fluid.

17. The method of claim 1, wherein impinging the coherent particulate fuel-rich and fuel-lean jet is substantially perpendicular to the surface to be heated.

18. The method of claim 1, wherein the surface to be heated comprises at least one of iron and steel making materials, and wherein the fuel-rich particulate jet comprises coal particles and optionally at least one of lime particles and iron oxide fines.

19. A method of heating a surface susceptible to oxidation or reduction, comprising:

generating a central, generally cylindrical, fuel-rich particulate jet, and a coaxial, annular, supersonic velocity, oxidant-rich jet having an auto-thermal ignition temperature greater than a temperature of the fuel-rich particular jet, the jets directed toward the surface to be heated, wherein a velocity of the fuel-rich particulate jet is less than the velocity of the oxidant-rich jet;

increasing the velocity of the fuel-rich particulate jet with a motive gas selected from the group consisting of an inert gas, argon, nitrogen, fuel, natural gas, vaporized petroleum liquids, vaporized coal derived liquids, carbon monoxide and hydrogen-rich streams from partial oxidation processes, and mixtures thereof;

oxidizing methane as a gaseous fuel for generating the annular supersonic oxidant-rich jet;

allowing the supersonic oxidant-rich jet and the fuel-rich particulate jet to coact to form a coherent particulate fuel-rich and fuel-lean jet comprising nitrogen as the motive gas for the fuel-rich particulate jet, and having a central particulate fuel-rich region and a coaxial annular fuel-lean region;

impinging the coherent particulate fuel-rich and fuel-lean jet upon the surface to be heated for forming a turbulent reaction zone at the surface; and controlling oxidation and reduction reactions at the turbulent reaction zone by adjusting at least one property of at least one of the supersonic oxidant-rich jet and the fuel-rich particulate jet.

20. A method of heating a surface susceptible to oxidation or reduction, comprising:

generating a central, generally cylindrical, fuel-rich particulate jet, and a coaxial, annular supersonic velocity, oxidant-rich jet having an auto-thermal ignition temperature greater than a temperature of the fuel-rich particulate jet, the jets directed toward the surface to be heated, wherein a velocity of the fuel-rich particulate jet is less than the velocity of the oxidant-rich jet, wherein generating the fuel-rich particulate jet comprises:

pressurizing a particulate feed with a least one of a non-fluidizing motive fluid and a pressurizing gas, and increasing the mobility of the particulate fee with a fluidizing motive fluid, wherein the motive fluid, the pressurizing gas and the fluidizing motive fluid are independently selected from a group consistency of an inert gas, argon, nitrogen, a gaseous fuel, natural gas, a liquid fuel, and a petroleum derived fuel oil;

allowing the supersonic oxidant-rich jet and the fuel-rich particulate jet to coact to form a coherent particulate fuel-rich and fuel-lean jet having a central particulate fuel-rich region and a coaxial annular fuel-lean region;

impinging the coherent particulate fuel-rich and fuel-lean jet upon the surface to be heated for forming a turbulent reaction zone at the surface; and controlling oxidation and reduction reactions at the turbulent reaction zone by adjusting at least one property of at least one of the supersonic oxidant-rich jet and the fuel-rich particulate jet.

21. The method of claim 20, further comprising controlling at least one of the ratio of the particulate feed to the motive fluid in the particulate, fuel-rich feed by adjusting the flow rate of the fluidizing motive fluid; and the feed rate of the particulate feed by adjusting the flow rate of the non-fluidizing motive fluid.

* * * * *

UNITED STATES PATENT AND TRADEMARK OFFICE
CERTIFICATE OF CORRECTION

PATENT NO. : 6,910,431 B2
DATED : June 28, 2005
INVENTOR(S) : Donald Prentice Satchell, Jr.

It is certified that error appears in the above-identified patent and that said Letters Patent is hereby corrected as shown below:

Column 7,
Line 66, after "fuel", insert -- is --.

Column 8,
Line 1, delete "coal tar distillate vapor" (first occurrence).

Column 10,
Line 4, replace "fee" with -- feed --.

Signed and Sealed this

Twentieth Day of December, 2005

JON W. DUDAS
*Director of the United States Patent and Trademark Office*